(12) United States Patent
Astrachan

(10) Patent No.: US 7,116,731 B2
(45) Date of Patent: Oct. 3, 2006

(54) METHOD AND APPARATUS FOR ADJUSTING SYMBOL TIMING AND/OR SYMBOL POSITIONING OF A RECEIVE BURST OF DATA WITHIN A RADIO RECEIVER

(75) Inventor: Paul M Astrachan, Austin, TX (US)

(73) Assignee: VIXS, Inc., Toronto (CA)

( * ) Notice: Subject to any disclaimer, the term of this patent is extended or adjusted under 35 U.S.C. 154(b) by 832 days.

(21) Appl. No.: 10/161,526

(22) Filed: Jun. 3, 2002

(65) Prior Publication Data

US 2003/0223521 A1  Dec. 4, 2003

(51) Int. Cl.
 *H04L 27/14* (2006.01)
(52) U.S. Cl. ........................ 375/326; 375/344
(58) Field of Classification Search .............. 375/260, 375/272, 324, 326, 334, 340, 344, 354; 370/206, 370/208; 329/300, 341
See application file for complete search history.

(56) References Cited

U.S. PATENT DOCUMENTS

| | | | |
|---|---|---|---|
| 5,809,009 A * | 9/1998 | Matsuoka et al. ........... | 370/206 |
| 6,175,550 B1 * | 1/2001 | van Nee ...................... | 370/206 |
| 6,744,828 B1 * | 6/2004 | Uchiyama et al. ........... | 375/326 |
| 6,810,028 B1 * | 10/2004 | Giallorenzi et al. ......... | 370/324 |
| 2002/0159544 A1 * | 10/2002 | Karaoguz .................... | 375/329 |

* cited by examiner

*Primary Examiner*—Young T. Tse
(74) *Attorney, Agent, or Firm*—Garlick Harrison & Markison; Bruce E. Stuckman

(57) ABSTRACT

A method and apparatus for adjusting symbol timing and/or symbol interval range of a receive burst of data within a radio receiver include processing that begins by receiving a radio frequency signal that includes bursts of data. The process then continues by determining a frequency offset for the burst of data based on a difference between the transmitter processing rate and a receiver processing rate. The processing then continues by determining a symbol timing offset and/or a symbol interval range offset based on the frequency offset. The process then proceeds by adjusting the initial symbol positioning and/or the symbol interval range offset of a burst of data based on the symbol timing offset.

26 Claims, 7 Drawing Sheets radio receiver 10

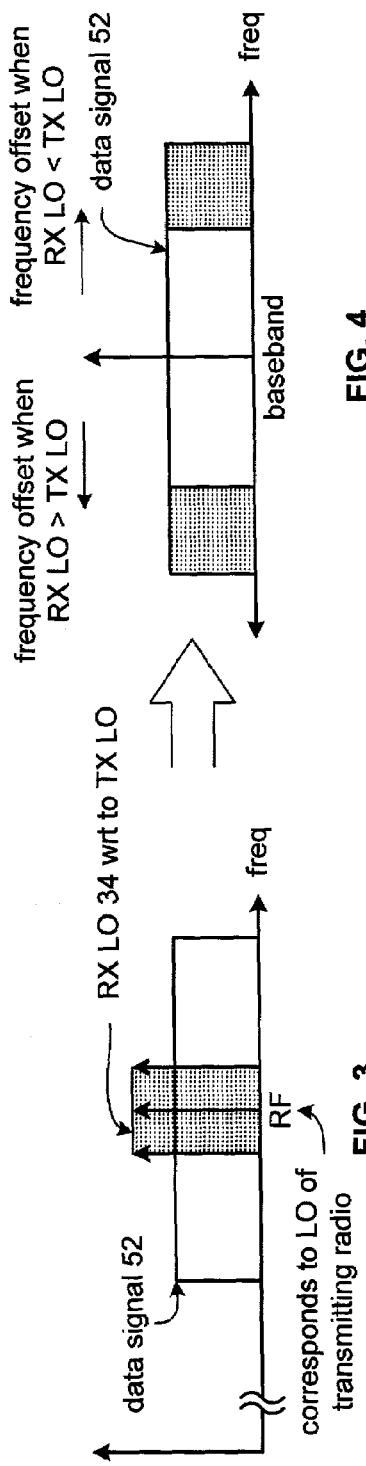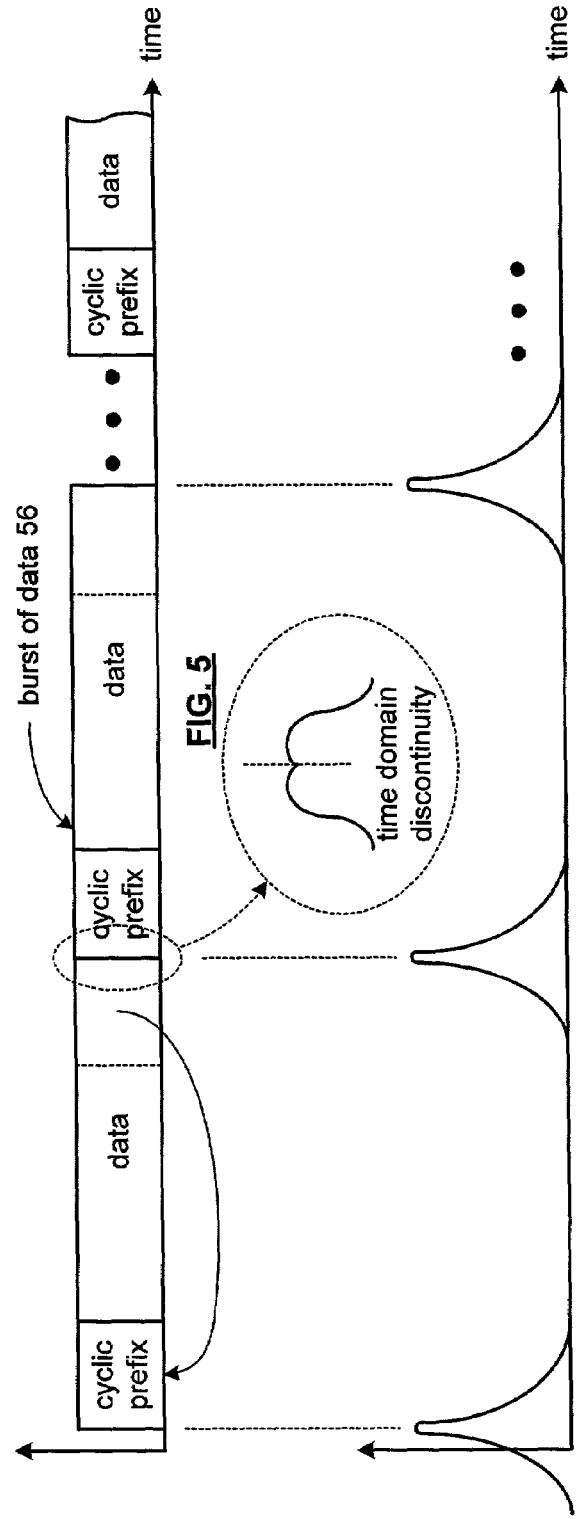

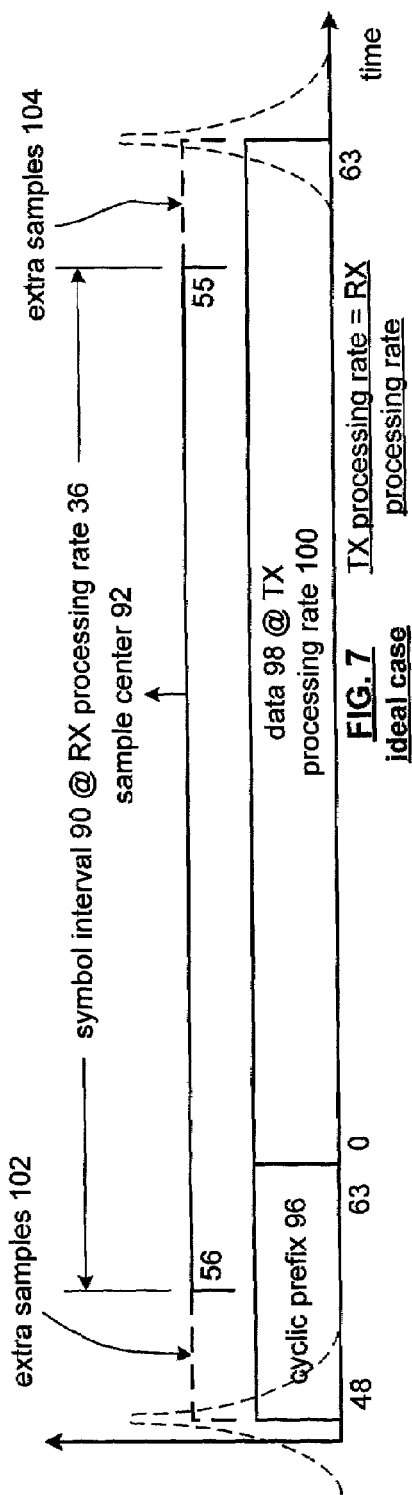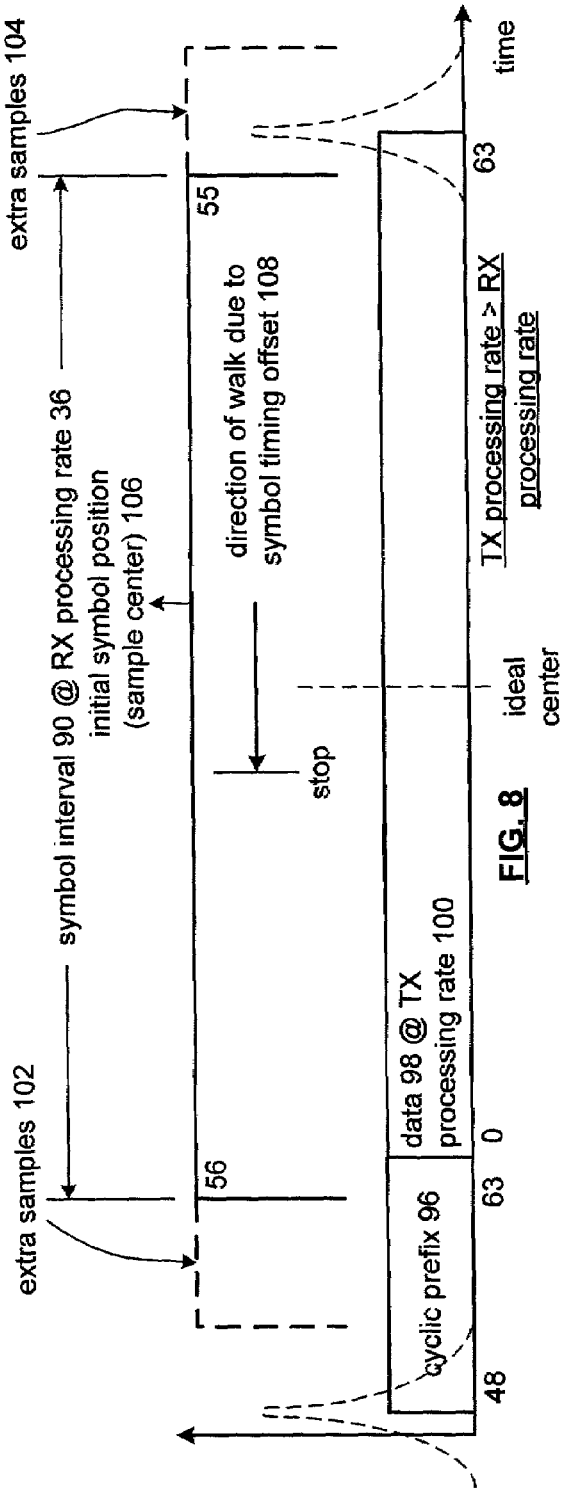

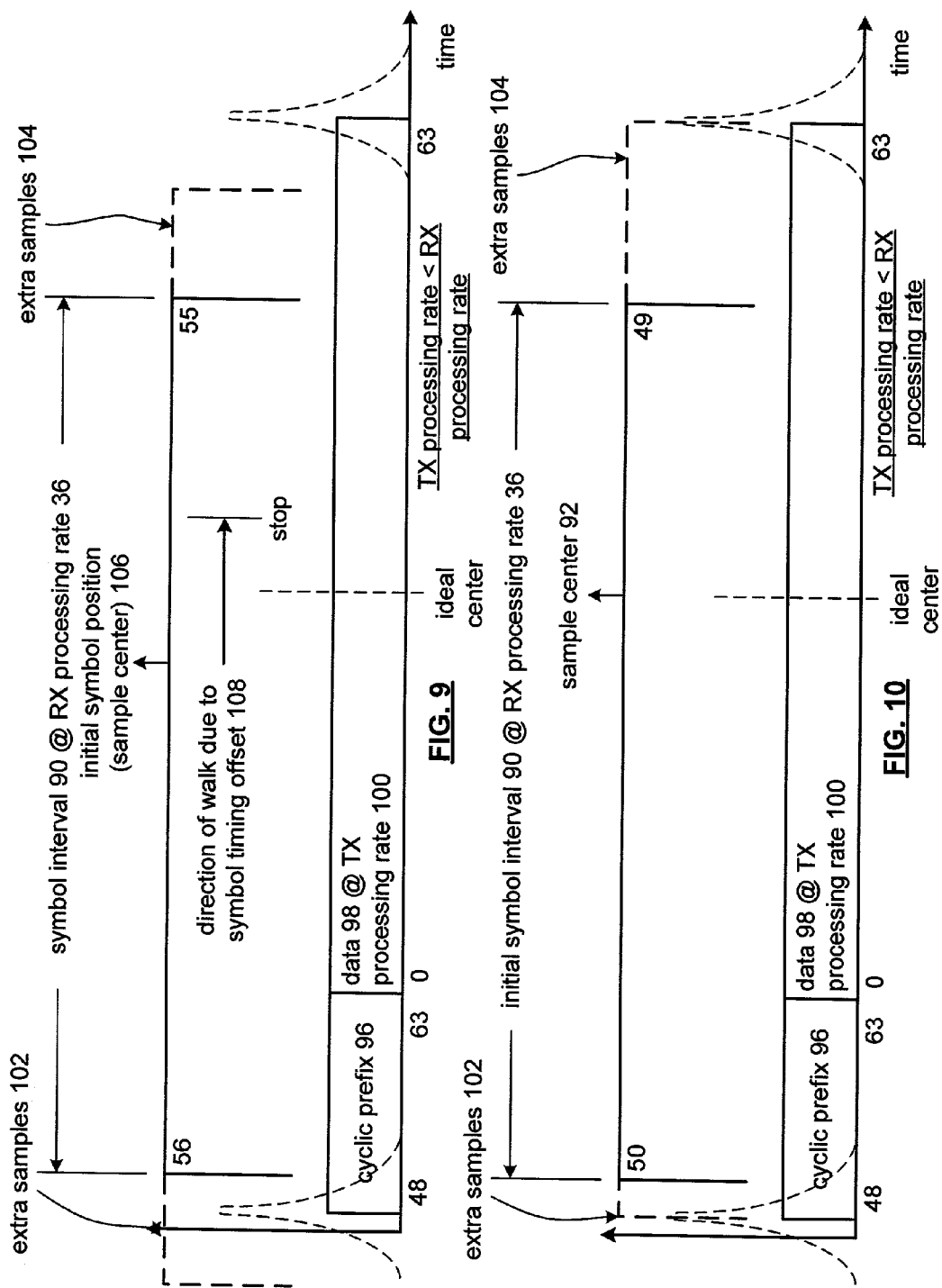

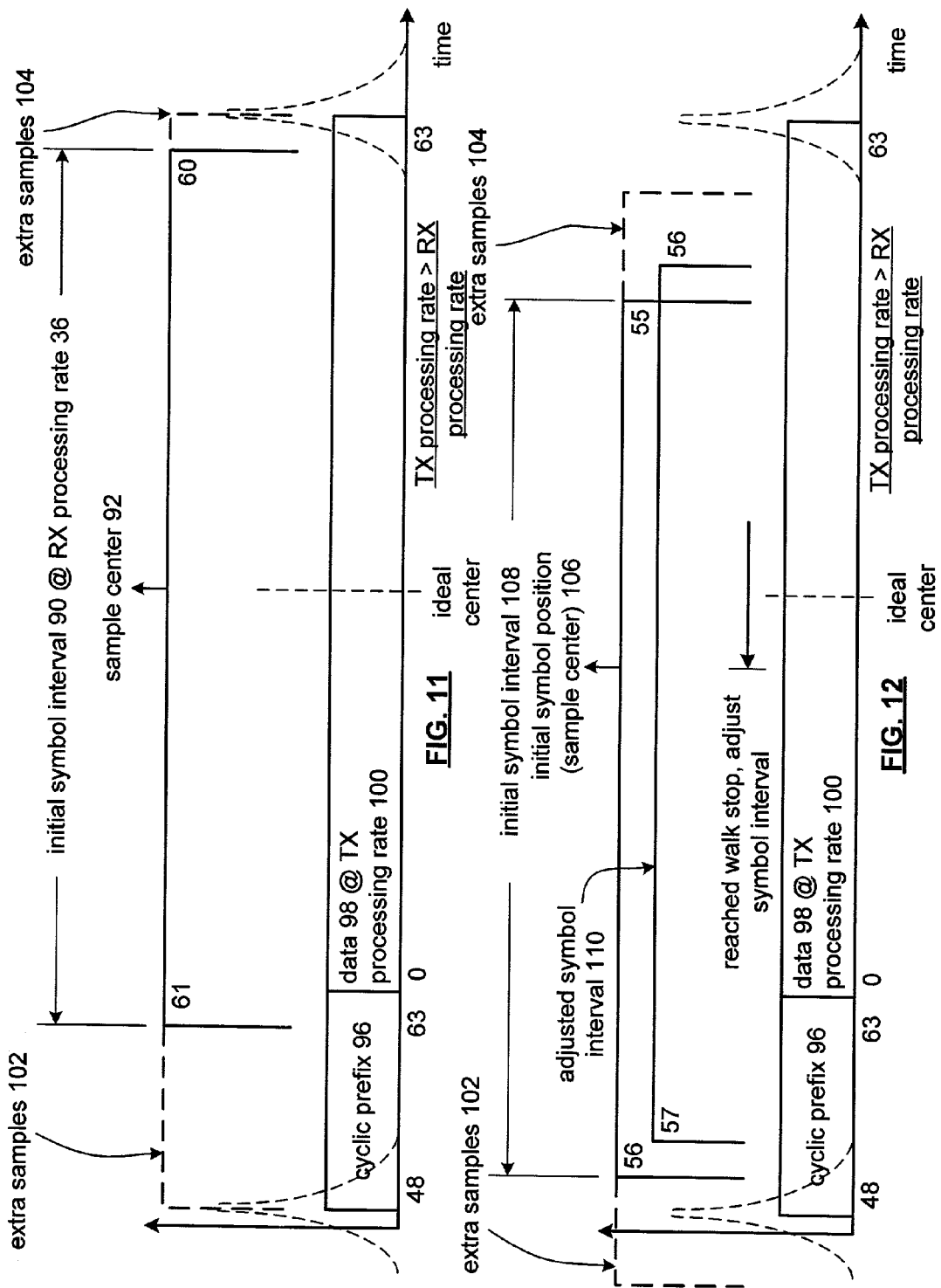

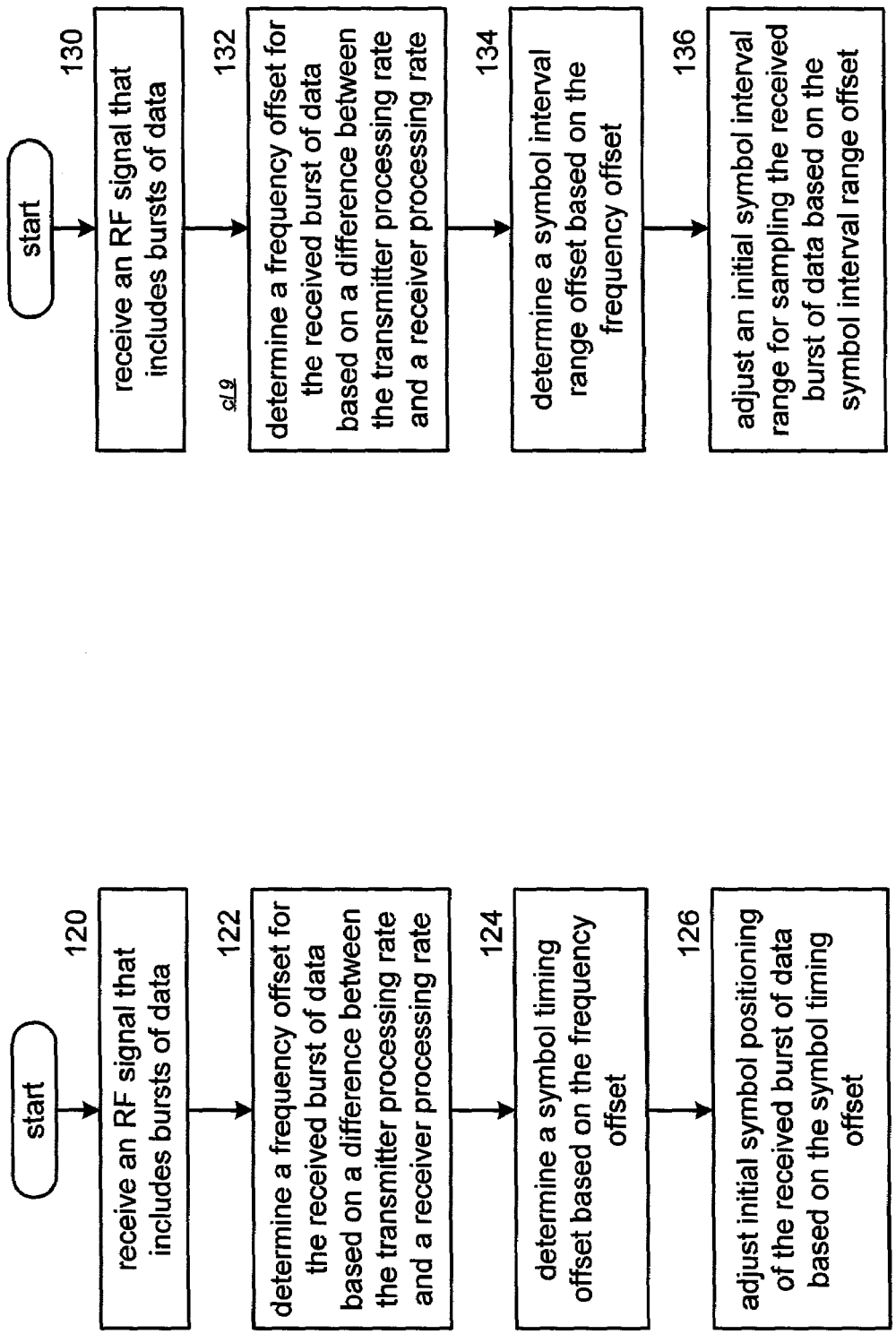

METHOD AND APPARATUS FOR ADJUSTING SYMBOL TIMING AND/OR SYMBOL POSITIONING OF A RECEIVE BURST OF DATA WITHIN A RADIO RECEIVER

BACKGROUND OF THE INVENTION

1. Technical Field of the Invention

This invention relates generally to wireless communication systems and more particularly to radio receivers utilized within such wireless communication systems.

2. Description of Related Art

As is known, wireless communication systems include a plurality of wireless communication devices and wireless infrastructure devices. The wireless communication devices, which may be radios, cellular telephones, stations coupled to personal computers, laptops, personal digital assistance, et cetera, communicate with each other via wireless communication channels that are administered by the wireless infrastructure devices. Such wireless infrastructure devices include base stations (e.g., for cellular wireless communication systems), access points (e.g., for wireless local area networks), system controllers, system administrators, et cetera.

As is also known, each wireless communication device and/or wireless infrastructure device includes a radio transceiver (i.e., a transmitter section and receiver section) to transmit and receive RF signals. A radio transmitter includes one or more intermediate frequency stages, a filter, a power amplifier, and coupling to an antenna. The one or more intermediate frequency stages mix an outbound baseband signal (e.g., data that has been encoded and/or modulated in accordance with a wireless communication standard such as IEEE802.11a, IEEE802.11b, Bluetooth, Global System for Mobile communications (GSM), Advance Mobil Phone System (AMPS), et cetera) with a local oscillation, or oscillations, to produce an outbound RF signal. The filter filters the outbound RF signal to attenuate unwanted frequency components of the RF signal and the power amplifier amplifies the filtered RF signal prior to transmission via the antenna.

The baseband processor of the transmitter produces outbound baseband signal at a given processing rate. Typically, the processing rate of the transmitting baseband processor is synchronized with the transmitting local oscillation or oscillations and is a fraction of the local oscillation, or oscillations.

As is also known, a radio receiver includes a low noise amplifier, one or more intermediate frequency stages, a filter, and a baseband processor. The low noise amplifier is coupled to receive an inbound RF signal via an antenna and amplifies the RF signal before providing it to the one or more intermediate frequency stages. The one or more intermediate frequency stages mix the amplified RF signal with a local oscillation, or oscillations, to produce an inbound baseband signal. The receiving baseband processor processes the baseband signal at a given processing rate to recapture data. Like the transmitter section, the processing rate of the baseband receiving processor is synchronized to, and is a fraction of, the receiver local oscillation or oscillations.

While wireless communication standards specify that the processing rate of both the transmitting and receiving baseband processors are to be the same and that the transmitter local oscillation or oscillations and the receiver local oscillation or local oscillations are to be the same, practical limitations of electronic circuitry makes it virtually impossible for the processing rates and local oscillations, from wireless communication device to wireless communication device, or wireless communication device to wireless infrastructure device, to be identical. As such, wireless communication standards, such as IEEE 802.11, specify an acceptable tolerance of variations of the processing rate and local oscillations from wireless communication device to wireless communication device and/or from wireless communication device to wireless infrastructure device. For example, the IEEE 802.11a specification specifies a tolerance of 20 PPM (parts per million) in each wireless communication device or wireless infrastructure device. As such, the local oscillation or oscillations, and processing rates from wireless communication device to wireless communication device and/or from wireless communication device to wireless infrastructure device, may be off by no more than a total of 40 PPM.

Due to the differences between the processing rates and local oscillations from wireless communication device to wireless communication device and/or wireless communication device to wireless infrastructure device, a receiver of a wireless communication device or wireless infrastructure device will almost certainly be operating at a different processing rate and having a different local oscillation or oscillations than the processing rate and local oscillations of the transmitter of another wireless communication device or wireless infrastructure device. This difference, when an RF signal is received, results in an offset within the receiver, which limits the receivers ability to accurately recapture data embedded within received RF signals.

Therefore, a need exists for a method and apparatus that increases a receiver's ability to accurately recapture data embedded within received RF signals.

BRIEF DESCRIPTION OF THE SEVERAL VIEWS OF THE DRAWINGS

FIGS. 3 and 4 are frequency domain representations of an RF signal, baseband signal and resulting frequency offset in accordance with the present invention;

FIGS. 5 and 6 are time domain representations of bursts of data and corresponding noise in accordance with the present invention;

FIG. 7 is a time domain representation of sampling a burst of data in an ideal case in accordance with the present invention;

FIG. 8 is a time domain representation of offsetting the initial symbol position of sampling a burst of data in accordance with the present invention;

FIG. 9 is a time domain representation of an alternate offsetting of the initial symbol position of sampling a burst of data in accordance with the present invention;

FIG. 10 is a time domain representation of adjusting the initial symbol interval for sampling a burst of data in accordance with the present invention;

FIG. 11 is a time domain representation of an alternate offsetting of the initial symbol interval for sampling a burst of data in accordance with the present invention;

FIG. 12 is a time domain representation of both adjusting the initial symbol position and symbol interval for sampling a burst of data in accordance with the present invention;

FIG. 13 is a logic diagram of a method for adjusting symbol timing of a receive burst of data within a radio receiver in accordance with the present invention; and FIG. 14 is a logic diagram of a method for adjusting symbol interval range during sampling of a burst of data within a radio receiver in accordance with the present invention.

DETAILED DESCRIPTION OF THE INVENTION

Generally, the present invention provides a method and apparatus for adjusting symbol timing and/or symbol interval range of a receive burst of data within a radio receiver. Such a method and apparatus include processing for adjusting the symbol timing by receiving a radio frequency signal that includes a received burst of data from a different wireless communication device. Accordingly, the radio frequency signal and the receive burst of data were processed based on the transmitter processing rate of the another wireless communication device. The process then continues by determining a frequency offset for the burst of data based on a difference between the transmitter processing rate and a receiver processing rate of the radio receiver. The processing then continues by determining a symbol timing offset based on the frequency offset. Accordingly, by knowing the frequency offset, which indicates how different the transmitter processing rate is from the receiver processing rate, the amount of drift, or "walking", during the processing of a packet of data containing multiple bursts of data will occur. The process then proceeds by adjusting the initial symbol positioning of a burst of data based on the symbol timing offset. As such, by adjusting the symbol timing offset in one direction, or the other, the resulting walking due to the difference between the transmitter processing rate and receiver processing rate can be more readily absorbed thus enabling the radio receiver to more accurately recapture data from received RF signals by avoiding noisy regions within the bursts of data.

Such a method and apparatus further include processing for adjusting the symbol interval range which includes processing that begins by receiving a radio frequency signal that includes the bursts of data. The processing then continues by determining a frequency offset for the received bursts of data based on a difference between the transmitter processing rate and the receiver processing rate. The process then continues by determining a symbol interval range offset based on the frequency offset. In order to provide the symbol interval offset range, more samples of the bursts of data are taken than are required to decode the bursts of data. As such, by shifting the symbol range to include one or more of these additional sample points, the symbol interval range is offset. The processing then continues by adjusting the initial symbol interval range for sampling the received bursts of data based on the symbol interval range offset. By adjusting the initial symbol interval range, a radio receiver can more accurately recapture embedded data from RF signals by more readily absorbing the offsets between the receiver processing rate and the transmitter processing rate.

Figure 1:
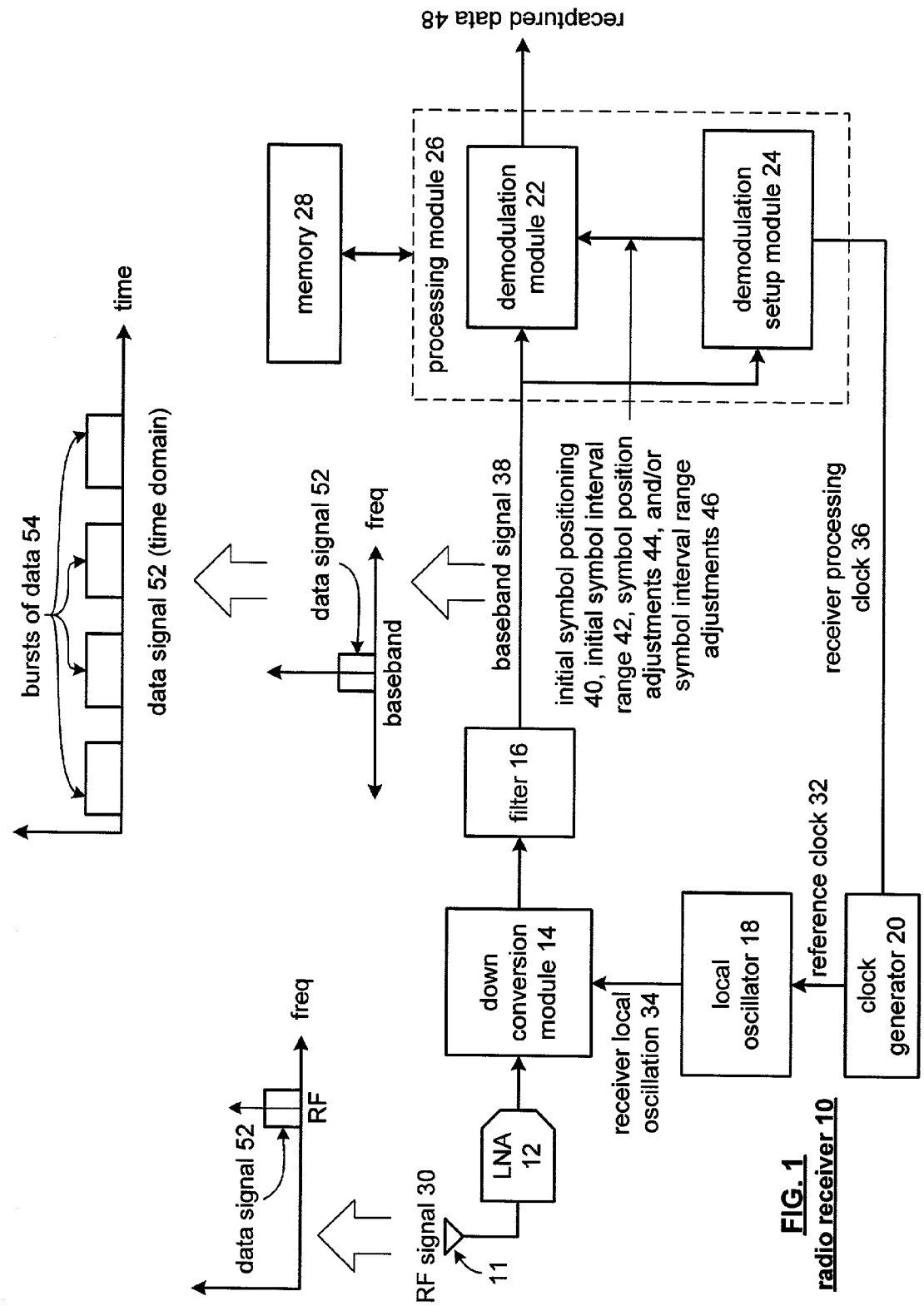
FIG. 1 is a schematic block diagram illustrating a radio receiver in accordance with the present invention.

The present invention can be more fully described with reference to FIGS. 1–14. FIG. 1 is a schematic block diagram illustrating a radio receiver 10 that includes a low noise amplifier 12, a down conversion module 14, a filter module 16, demodulation module 22, demodulation set-up module 24, memory 28, processing module 26, and a clock generator 20. As shown, the demodulation module 22 and the demodulation set-up module 24 may be implemented within processing module 26. Alternatively, the demodulation module 22 and the demodulation setup module 24 may be separate processing modules. The processing module 26, or separate processing modules for the demodulation module 22 and demodulation setup module 24, may each be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 28 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 22, 24, and/or 26 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory 28 stores, and the processing module 22, 24, and/or 26 executes, operational instructions corresponding to at least some of the steps and/or functions illustrated in FIGS. 1–14.

In operation, the low noise amplifier (LNA) 12 receives a radio frequency signal 30 via an antenna 11. The radio frequency signal 30 is illustrated in a frequency domain plot to include a data signal 52 centered about a radio frequency (RF). The low noise amplifier amplifies the RF signal 30 and provides the amplified RF signal to the down conversion module 14. The down conversion module 14 mixes the amplified RF signal with a receiver local oscillation 34 to produce a down-converted signal. For direct conversion to baseband, the receiver local oscillation 34 is designed to be equal to the center carrier frequency of RF signal 30.

The local oscillator 18 generates the receiver local oscillation 34 from a reference clock 32, which is provided by the clock generator 20 such as a crystal oscillator, phase locked loop, etc. Since the RF signal 30 is produced by a transmitter of a different wireless communication device than the wireless communication device including radio receiver 10, the frequency of the RF signal 30 will most likely not match the frequency of the receiver local oscillation 34 and may be off by as much as 40 PPM.

The filter 16 filters the down converted signal from the down conversion module 14 to produce a baseband signal 38. Accordingly, the filter 16 may be a low pass filter and/or bandpass filter such that unwanted signal components of the down-converted signal are attenuated and the frequency components of interest are passed to produce the baseband signal 38.

A frequency domain representation of the baseband signal 38 is depicted to include the data signal 52 being centered at zero, which corresponds to baseband. As will be discussed in greater detail with reference to FIGS. 3–5, unless the receiver local oscillation 34 exactly matches the local oscillation of the transmitter, which produce the RF signal 30, data signal 52 will not be centered exactly at zero frequency. It will be offset in one direction or the other from zero based on the difference between the receiver local oscillation 34 and the transmitter local oscillation that produced RF signal 30.

The baseband data signal 52 is further shown in the time domain to include a plurality of bursts of data 54. The bursts of data will be described in greater detail with reference to FIGS. 5 and 6.

The demodulation module 22 receives the baseband signal 38 and an input from the demodulation set-up module 24 to recapture data 48 from the baseband signal 38. The data modulation module 22 will be described in greater detail with reference to FIG. 2.

The demodulation set-up module 24 operates at a receiver processing rate in accordance with the receiver processing clock 36. As illustrated, the receiver processing clock 36 is produced by the clock generator 20, which also produces the reference clock 32. To be compliant with wireless communication standards, including IEEE 802.11a, the reference clock 32 is synchronized with the receiver processing clock 36. Thus, the receiver processing clock 36 is synchronized with the receiver local oscillation 34.

The demodulation set-up module 24 receives the baseband signal 38 and generates an initial symbol positioning signal 40, an initial symbol interval range signal 42, a symbol position adjustment signal 44 and/or a symbol interval range adjustment signal 46. One or more of these signals 40–46, which will be described in greater detail with reference to FIGS. 2–14, are provided to the demodulation module 22, which adjusts its sampling of the bursts of data within the baseband signal 38 to more accurately recapture data 48.

Figure 2:
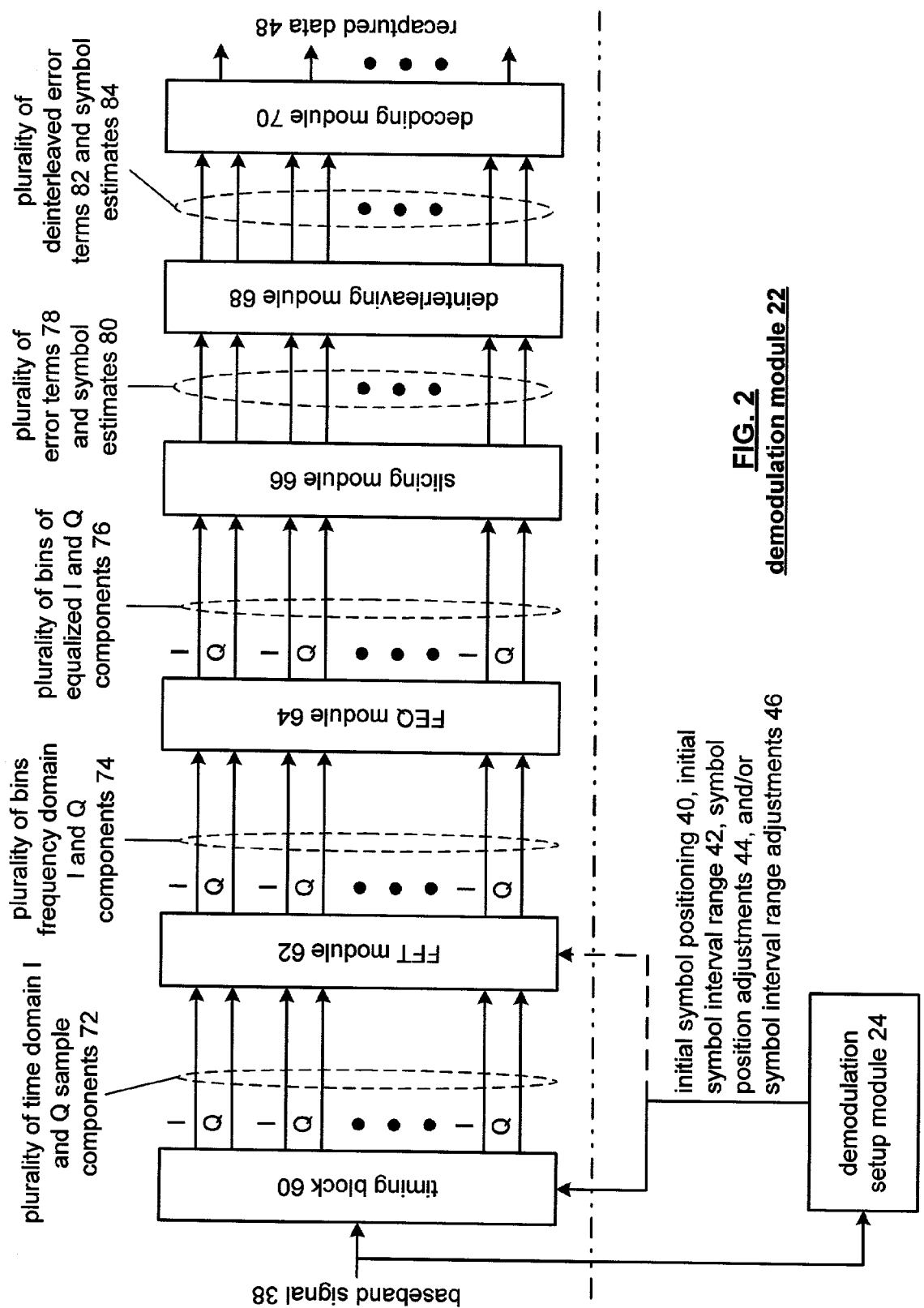
FIG. 2 is a schematic block diagram illustrating a demodulation module and demodulation set-up module in accordance with the present invention.

FIG. 2 illustrates the demodulation module 22 in greater detail. As shown, the demodulation module 22 includes a timing block 60, a fast-Fourier-transform (FFT) module 62, a frequency equalization (FEQ) module 64, a slicing module 66, a de-interleaving module 68, and a decoding module 70. The timing block 60 receives the baseband signal 38, which is in the analog domain and includes a plurality of sine waves with varying amplitudes and phase offsets that correspond to the encoded and/or modulated data. For example, in an IEEE 802.11a compliant system, the baseband signal 38 includes 63 different sine waves and a DC signal each having its own magnitude and phase offset that corresponds to encoded data. Of the 63 sine waves, 52 carrying data or sync tones and the remaining are either used for guard bands or have zero data.

The timing block 60 separates the sine waves contained within baseband signal 38 and converts each individual sine wave into a time domain I and Q component. As shown, the resulting output of the timing block 60 includes a plurality of time domain I and Q sample components 72. Each sample component corresponds to one of the sine waves (i.e., sub-carriers of a channel) of the baseband signal 38. Accordingly, the timing block 60 is converting the amplitude and phase offset of each sine wave into corresponding digital values represented by the time domain I and Q sample components 72.

The processing performed by the timing block 60 may be adjusted in accordance with the initial symbol positioning 40, initial symbol interval range 42, symbol position adjustments 44 and/or symbol interval range adjustments 46 provided by the demodulation set-up module 24. Accordingly, the sampling performed by the timing block 60 upon the baseband signal 38 will be adjusted in accordance with the information 40–46 provided by the demodulation set-up module 24. The sampling adjustments provided by the demodulation set-up module 24 will be described in greater detail with reference to FIGS. 3–14.

The FFT module 62 receives the plurality of time domain I and Q sample components 72 and converts them into a plurality of bins of frequency domain I and Q components 74. Accordingly, the FFT module 62, on a per bin basis, is converting the digital representation of the amplitude and phase offset of the sine waves produced by the decompulator 60 into an I coordinate and a Q coordinate corresponding to a constellation mapping. For example, if the constellation mapping used by the transmitter is a 64 quadrature amplitude modulation (QAM) scheme, the I and Q components for each sine wave will correspond approximately to a particular constellation point within the I and Q constellation map.

The frequency equalizer (FEQ) module 64 receives the plurality of bins of frequency domain I and Q components 74 and filters these signals to remove adverse affects caused by the channel on which the RF signal was received. The particular frequency response of the FEQ module 64 is set-up to be approximately the inverse of the frequency characteristics of the RF channel on which the RF signal 30 was received. The FEQ module 64 produces a plurality of bins of equalized I and Q components of 76 that are provided to the slicing module 66.

The slicing module 66 determines a plurality of error terms and symbol estimates for each bin of equalized I and Q components 76. The de-interleaving module 68 receives the plurality of error terms 78 and symbol estimates 80 and de-interleaves them to produce a plurality of de-interleaved error terms 82 and symbol estimates 84. The de-interleaving performed by the de-interleaving module 68 is the inverse of the interleaving function used by the transmitter. Typically, interleaving is used to take portions of an encoded data symbol and put it on different subcarriers since each sub-carrier of a channel may have different frequency responses. As such, by distributing an encoded symbol over multiple subcarriers, the ability to recapture the data represented by the encoded symbol is enhanced. The decoding module 70 receives the plurality of de-interleaved error terms 82 and symbol estimates 84 and produces therefrom recaptured data 48.

As shown, the demodulation set-up module 24 may alternatively, or in addition to, provide the adjustment and/or initial signals 40–46 to the FFT module 62. As such, the FFT module 62 may adjust its sampling of the time domain I and Q components in accordance with the information provided by the demodulation set-up module 24.

FIGS. 3 and 4 are frequency domain representations of the RF signal and corresponding baseband signal. As shown in FIG. 3, the data signal 52 of RF signal is centered about an RF, which corresponds to the local oscillation of the transmitting radio. The local oscillation 34 of the receiver will most likely not identically match the local oscillation of the transmitting radio. As such, the local oscillation 34 of the receiver will be within a plus or minus tolerance of the local oscillation of the transmitting radio. This variance in frequency with respect to the RF is shown in the shaded area.

Within the radio receiver, when the RF signal is down-converted to baseband, the resulting baseband signal, as shown in FIG. 4, may have an offset due to the difference between the receiver local oscillation 34 and the transmitter local oscillation. As shown in FIG. 4, the offset will shift the baseband data signal 52 to the left when the receiver local oscillation 34 is greater than the transmitter local oscillation. This offset is illustrated via the shaded area. FIG. 4 further illustrates that the baseband data signal 52 will be shifted to the right when the receiver local oscillation is less than the transmitter local oscillation, which is also illustrated by the shaded area. Since the receiver local oscillation is synchronized to and corresponds to the receiver processing rate, based on the frequency offset, the difference between the transmitter processing rate and the receiver processing rate may be readily determined.

FIGS. 5 and 6 are representative of the bursts of data 54 contained within the data signal 52 represented in the time domain. As shown, each burst of data 56 includes a cyclic prefix and data. The cyclic prefix is essentially a portion of the data repeated prior to the transmission of the data. As shown, the end portion of the data is copied and repeated within the cyclic prefix for the corresponding data. The cyclic prefix is used to allow the noise injected due to the discontinuity from burst of data to burst of data to settle before the data is actually sampled. As shown, between the data of one burst of data and cyclic prefix of another burst of data a discontinuity results since the received analog baseband signal is changing from one encoded data set to another.

The resulting discontinuity at each cyclic prefix produces a sin(X)/X waveform that generates noise as depicted in FIG. 6. Accordingly, if the data within a burst of data 56 is being sampled when the noise produced by the discontinuity is relatively large, the accuracy for recapturing that data is impaired. As such, and in accordance with the present invention, it is desired to sample the data of the burst of data when the noise produced by the discontinuity is at a minimum.

FIG. 7 illustrates an ideal case for sampling a burst of data in accordance with the present invention. As shown, the burst of data includes data 98, which was prepared at the transmitter processing rate 100. The burst of data also includes the cyclic prefix 96. In this example, the data 98 includes 64 (from 0 to 63) samples of data, which correspond to 64 subcarrier frequencies of an IEEE 802.11a channel. In this example, the cyclic prefix 96 includes the later 16 bins of the data 98.

The illustration of FIG. 7 further depicts the noise energy produced by the discontinuity caused between the bursts of data. To avoid sampling in the noisy region, the symbol interval 90, which is at the receiver processing rate 36, and its corresponding sample center 92 should be centered between the noise produced by the discontinuities of the bursts of data. In this ideal case, the transmitter processing rate equals the receiver processing rate as such, from burst of data to burst of data, the sampling center 92 and corresponding symbol interval 90 will remain at the center of the received bursts of data. Thus, no walking will occur. Accordingly, regardless of the number of bursts of data within a received packet, the sample interval 90 will remain centered between the noise produced by the discontinuities.

In one embodiment, the receiver samples the 64 bins defined by the sampling interval 90 and samples extra bins 102 and 104. The symbol interval 90 is shown to range from sample 56 of the cyclic prefix 96 to sample 55 of the data 98. Since the cyclic prefix 96 includes the later portion of the data 98, the resulting samples of symbol interval 90 include the desired 64 samples of the data 98. The extra samples 102 and 104 are taken but not used for the ideal case or in subsequent processing to recapture the encoded data.

FIG. 8 illustrates a time domain representation of a burst a data when the transmitting processing rate is greater than the receiver processing rate. Since the transmitter processing rate is greater than the receiver processing rate, the receiver, for each burst of data, will effecting be taking less than 64 samples. On average, the receiver will be sampling the receive bursts of data at a rate of 63.xx, where xx corresponds to the percentage of frequency offset. As such, due to this mismatch in processing rates, the sampling of the data 98 will walk in a direction from right to left as shown by the arrow 108. To compensate for this walking, the initial symbol position, (i.e., the sample center 106) is offset from the ideal center of the receive bursts of data. By offsetting the initial symbol position 106, the symbol interval 90 at the receiver processing rate 36 is shifted to the right. However, as the receiver processes a plurality of bursts of data, the symbol interval 90 will gradually walk from right to left.

The amount of offset for the initial symbol position 106 depends on the amount of difference between the transmitter processing rate and the receiver processing rate and the number of bursts within the particular packet of data. For example, if the processing rate of the transmitter is approximately equal to the receiver processing rate, the amount of walking will be minimal such that the offset will be minimal. As the difference between the rates increase, the amount of walking will increase. The amount of walking is also dependent on the number of bursts of data within the receive packet. As such, the more bursts, the more walking will occur. As illustrated, the walking is allowed to proceed to a particular stop point such that the symbol interval 90 is avoiding the noise energy produced by the discontinuities between the bursts of data.

FIG. 9 illustrates a graphical representation of the transmitter processing rate being less than the receiver processing rate. In this instance, the receiver is effectively sampling more than 64 samples per bursts of data. For example, the receiver is sampling 64.yy samples per bursts of data, where yy corresponds to the percentage of difference. As such, the symbol interval over a plurality of bursts of data will walk from left to right. Accordingly, the initial symbol position 106 is offset from the ideal center to allow the symbol interval 90 to walk from left to right. The difference between the processing rate of the transmitter and receiver is referred to as the symbol timing offset 108, which may be readily determined from the frequency offset depicted in FIG. 4 and the relationship between the local oscillation and the processing rate. As with the offsetting depicted in FIG. 8, the initial symbol position 106, which is based on the symbol timing offset 108, is based on the degree of difference between the processing rate of the transmitter and receiver as well as the number of bursts within the received packet.

FIG. 10 illustrates a diagram wherein the symbol interval is offset. In this illustration, the transmitter processing rate is less than the receiver processing rate. As such, the receiver is effectively sampling the bursts of data at a rate greater than 64 samples per burst. As such, the sampling from burst-to-burst will walk from left to right. To accommodate for the walking, the initial symbol interval 90 is offset from the ideal case illustrated in FIG. 7. The sampling center 92 remains aligned with the ideal sampling center but the initial symbol interval 90 with respect to the sampling center 92 is offset to the left. As such, the initial symbol interval 90 includes some of the extra samples 102 depicted in FIG. 7 and some of the samples for the ideal sampling interval are included in extra samples 104. Thus, from burst-to-burst, the initial sampling interval will walk from left to right with respect to the cyclic prefix 96 and data 98, but with the sample interval offset, the noisy regions will be substantially avoided.

FIG. 11 illustrates a time domain representation of sampling the received data 98 within a burst of data when the transmitter processing rate is greater than the receiver processing rate. In this instance, the receiver is effectively sampling the data within a burst of data at a rate lower than 64 samples per burst. As such, the sampling from burst-to-burst will effectively walk from right to left.

To compensate for this walking, the initial symbol interval 90 is offset to the right with respect to the sample center 92. As such, some of the extra samples 104 are included in the initial symbol interval 90. As such, as bursts of data are sampled over time, the symbol interval 90 will walk to the left but maintaining its position between the noise burst caused by the discontinuities from burst-to-burst.

FIG. 12 illustrates sampling of bursts of data when the transmitter processing rate is greater than the receiver processing rate. As such, the receiver is effectively sampling less than 64 samples per bursts of data. As a result, the sampling from burst-to-burst will walk from right to left. In this example, the initial symbol position 106 will be offset to the right from the ideal center. As shown in FIG. 12, after the initial position 106 has walked to its stop point, the symbol interval 108 is adjusted. As shown, the initial symbol interval 108 spans from sample 56 of the cyclic prefix 96 to sample 55 of data 98. Once the symbol position 106 has reached its stop point, the symbol interval is adjusted. As shown, the adjusted symbol interval 110 is now sampling from sample 57 of the cyclic prefix 96 to sample 56 of data 98. As such, the combination of offsetting the sample position and adjusting the symbol interval allows for even greater walking of the sampling of the received data while maintaining the sampling positions between the noisy regions caused by the discontinuity. As one of average skill in the art will appreciate other combinations of offsetting the sample position and adjusting the symbol interval may be used to accommodate for various walking conditions.

FIG. 13 illustrates a logic diagram of a method for adjusting symbol timing of a received burst of data within a radio receiver. The processing begins at Step 120 where an RF signal that includes bursts of data is received. The radio frequency signal and the received bursts of data were processed at a rate corresponding to a transmitter processing rate. The process then proceeds to Step 122 where a frequency offset for the burst of data is determined based on a difference between the transmitter processing rate and the receiver processing rate. This may be done by determining the frequency offset based on a difference between the transmitter local oscillation, which corresponds to the frequency of the received RF signal and the receiver local oscillation. Alternatively, the frequency offset may be determined based on a difference between the transmitter data rate and the receiver data rate.

The process then proceeds to Step 124 where a symbol timing offset is determined based on the frequency offset. This may be done by determining a scaling factor based on the duration of the receive burst of data and frequency offset. The symbol timing offset is then based on the scaling factor. Accordingly, the scaling factor indicates how much walking the sampling of the receive burst of data will occur during the sampling of the entire packet. Accordingly, the more bursts of data within a packet and the greater the offset between the transmitter processing rate and receiver processing rate, the greater the amount of walking and the larger the scaling factor. The process then proceeds to Step 126 where the initial symbol position of the receive bursts of data is adjusted based on the symbol timing offset.

FIG. 14 illustrates a logic diagram of a method for adjusting symbol interval range during sampling of a burst of data within a radio receiver. The process begins at Step 130 where an RF signal that includes bursts of data is received. The process then proceeds to Step 132 where a frequency offset for the received bursts of data is determined based on a difference between the transmitter processing rate and the receiver processing rate. The process then proceeds to Step 134 where a symbol interval range offset is determined based on the frequency offset. The process then proceeds to Step 136 where an initial symbol interval range is adjusted for sampling the receive bursts of data based on the symbol interval range. This was generally illustrated with reference to FIGS. 10–12.

The preceding discussion has presented a method and apparatus for improving a receiver's ability to accurately recover data embedded within received RF signals. As one of average skill in the art will appreciate, other embodiments may be derived from the teaching of the present invention without deviating from the scope of the claims.

What is claimed is:

1. A method for adjusting symbol timing of a received burst of data within a radio receiver, the method comprises:
   receiving a radio frequency signal that includes the received burst of data, wherein the radio frequency signal and the received burst of data were processed in accordance with a transmitter processing rate;
   determining a frequency offset for the received burst of data based on a difference between the transmitter processing rate and a receiver processing rate of the radio receiver;
   determining a symbol timing offset based on the frequency offset; and
   adjusting initial symbol positioning of the received burst of data based on the symbol timing offset.

2. The method of claim 1, wherein the determining the symbol timing offset comprises:
   determining a scaling factor based on duration of the received burst of data and the frequency offset; and
   determining the symbol timing offset based on the scaling factor.

3. The method of claim 1, wherein the adjusting the initial symbol positioning comprises:
   adjusting the initial symbol positioning by an amount proportional to the symbol timing offset.

4. The method of claim 1 further comprises:
   adjusting initial symbol interval range based on the symbol timing offset.

5. The method of claim 4 further comprises: adjusting the initial symbol interval range based on a symbol interval range offset and duration of the received burst of data.

6. The method of claim 4 further comprises:
   monitoring drift of the initial symbol interval range; and
   when the drift reaches a drift limit, adjusting the initial symbol interval range to produce an adjusted symbol interval range.

7. The method of claim 1, wherein the determining the frequency offset for the received burst of data further comprises at least one of:
   determining the frequency offset based on a difference between a transmitter local oscillation and a receiver local oscillation; and
   determining the frequency offset based on a difference between a transmitter processing rate and a receiver processing rate.

8. A method for adjusting symbol interval range during sampling of a received burst of data within a radio receiver, the method comprises:
   receiving a radio frequency signal that includes the received burst of data, wherein the radio frequency signal and the received burst of data were processed in accordance with a transmitter processing rate;

determining a frequency offset for the received burst of data based on a difference between the transmitter processing rate and a receiver processing rate of the radio receiver;
determining a symbol interval range offset based on the frequency offset; and
adjusting an initial symbol interval range for sampling the received burst of data based on the symbol interval range offset.

9. The method of claim 8, wherein the determining the symbol interval range offset comprises:
determining a scaling factor based on duration of the received burst of data and the frequency offset; and
determining the symbol interval range offset based on the scaling factor.

10. The method of claim 8 further comprises:
adjusting initial symbol timing positioning based on the symbol interval range offset.

11. The method of claim 10 further comprises: adjusting the initial symbol interval range based on the symbol interval range offset and duration of the received burst of data.

12. The method of claim 10 further comprises:
monitoring drift of the initial symbol interval range; and
when the drift reaches a drift limit, adjusting the initial symbol interval range to produce an adjusted symbol interval range.

13. The method of claim 8, wherein the determining the frequency offset for the received burst of data further comprises at least one of:
determining the frequency offset based on a difference between a transmitter local oscillation and a receiver local oscillation; and
determining the frequency offset based on a difference between a transmitter processing rate and a receiver processing rate.

14. A radio receiver comprises:
antenna for receiving a radio frequency signal, wherein the radio frequency signal includes a burst of data, wherein the radio frequency signal and the received burst of data were processed in accordance with a transmitter processing rate;
down-conversion module operably coupled to convert the radio frequency signal into a baseband signal in accordance with a receiver local oscillation;
demodulation setup module operable to:
determine a frequency offset for the burst of data based on a difference between the transmitter processing rate and a receiver processing rate of the radio receiver, wherein the receiver processing rate relates to the receiver local oscillation;
determine a symbol timing offset based on the frequency offset; and
establish an initial symbol positioning for sampling the baseband signal based on the symbol timing offset; and
demodulation module operably coupled to recapture the data from the baseband signal utilizing the initial symbol positioning.

15. The radio receiver of claim 14, wherein the demodulation setup module determines the symbol timing offset by:
determining a scaling factor based on duration of the received burst of data and the frequency offset; and
determining the symbol timing offset based on the scaling factor.

16. The radio receiver of claim 14, wherein the demodulation setup module adjusts the initial symbol positioning by:
adjusting the initial symbol positioning by an amount proportional to the symbol timing offset.

17. The radio receiver of claim 14, wherein the demodulation setup module further functions to:
adjust initial symbol interval range based on the symbol timing offset.

18. The radio receiver of claim 17, wherein the demodulation setup module further functions to:
adjust the initial symbol interval range based on a symbol interval range offset and duration of the received burst of data.

19. The radio receiver of claim 17, wherein the demodulation setup module further functions to:
monitor drift of the initial symbol interval range; and
when the drift reaches a drift limit, adjust the initial symbol interval range to produce an adjusted symbol interval range.

20. The radio receiver of claim 14, wherein the demodulation setup module further functions to determine the frequency offset for the received burst of data by at least one of:
determining the frequency offset based on a difference between a transmitter local oscillation and the receiver local oscillation; and
determining the frequency offset based on a difference between a transmitter processing rate and a receiver processing rate.

21. A radio receiver comprises:
antenna for receiving a radio frequency signal, wherein the radio frequency signal includes a burst of data, wherein the radio frequency signal and the received burst of data were processed in accordance with a transmitter processing rate;
down-conversion module operably coupled to convert the radio frequency signal into a baseband signal in accordance with a receiver local oscillation;
demodulation setup module operable to:
determine a frequency offset for the burst of data based on a difference between the transmitter processing rate and a receiver processing rate of the radio receiver, wherein the receiver processing rate relates to the receiver local oscillation;
determine a symbol interval range offset based on the frequency offset; and
adjust an initial symbol interval range for sampling the received burst of data based on the symbol interval range offset; and
demodulation module operably coupled to recapture the data from the baseband signal utilizing the initial symbol interval range.

22. The radio receiver of claim 21, wherein the demodulation setup module functions to determine the symbol interval range offset by:
determining a scaling factor based on duration of the received burst of data and the frequency offset; and
determining the symbol interval range offset based on the scaling factor.

23. The radio receiver of claim 21, wherein the demodulation setup module further functions to:
adjust initial symbol timing positioning based on the symbol interval range offset.

24. The radio receiver of claim 23, wherein the demodulation setup module further functions to:
adjust the initial symbol interval range based on the symbol interval range offset and duration of the received burst of data.

25. The radio receiver of claim 23, wherein the demodulation setup module further functions to:
monitor drift of the initial symbol interval range; and
when the drift reaches a drift limit, adjust the initial symbol interval range to produce an adjusted symbol interval range.

26. The radio receiver of claim 21, wherein the demodulation setup module further functions to determine the frequency offset for the received burst of data by at least one of:
determining the frequency offset based on a difference between a transmitter local oscillation and the receiver local oscillation; and
determining the frequency offset based on a difference between the transmitter processing rate and a receiver processing rate.

* * * * *